(12) United States Patent
Takahashi et al.

(10) Patent No.: US 6,555,608 B2
(45) Date of Patent: Apr. 29, 2003

(54) WHITE STANDARD PAINT

(75) Inventors: Takashi Takahashi, Tokyo (JP); Yukio Ikezawa, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/766,401

(22) Filed: Jan. 19, 2001

(65) Prior Publication Data

US 2001/0009943 A1 Jul. 26, 2001

(30) Foreign Application Priority Data

Jan. 24, 2000 (JP) ........................................ 2000-014345

(51) Int. Cl.⁷ ................................................. C08K 3/30
(52) U.S. Cl. ...................................................... 524/423
(58) Field of Search .................................. 524/423, 422

(56) References Cited

U.S. PATENT DOCUMENTS 3,951,721 A   4/1976   Ishibai et al.
4,211,682 A * 7/1980   Suminoe et al. ............ 524/423

FOREIGN PATENT DOCUMENTS

GB          393505   *   6/1933   .................. 524/423

* cited by examiner

*Primary Examiner*—Peter Szekely
(74) *Attorney, Agent, or Firm*—Chapman and Cutler

(57) ABSTRACT

A standard white paint with good weather resistance and improvement of reflectivity characteristics for UV as well as adhesion to the substrate is provided. The white standard paint of the present invention contains barium sulfate, binder and solvent in which Polyvinyl alcohol is used as binder. The polymerization degree of the polyvinyl alcohol is ranging from 900 to 1100 and the saponification degree is ranging from 86 mol % to 90 mol %.

4 Claims, 1 Drawing Sheet

WHITE STANDARD PAINT

BACKGROUND OF THE INVENTION

1. Field of the Invention

The present invention relates to a white standard paint with improvement of reflectivity characteristics for ultraviolet (hereinafter referred to as UV).

2. Description of Related Art

The white standard paint is used to define white color, for example, which is painted on the inner wall of an integrated sphere for spectrum transmittance and spectrum reflection meter to form a diffuse reflection characteristics film. This white standard paint comprises at least 3 components of barium sulfate, binder and solvent.

It is stated that the binder greatly contributes to the diffuse reflectivity characteristics and the know how around it is very important, since, the composition of the binder is not publicized by the paint manufacturers.

SUMMARY OF THE INVENTION

Nevertheless, the white standard paint on the market typically has not uniformity in diffuse reflectivity characteristics, it shows less diffuse reflectivity characteristics for UV than for the visible range. So far the market has a need for white standard paint with improved diffuse reflectivity characteristics.

Further, there are several problems that adhesion to the substrate on which the white standard paint is applied is weak, and proneness to cracks and the weather resistant against UV rays is poor.

The object of the present invention is to solve the above mentioned problems and to provide white standard paint that has good weather resistance and that improves reflectivity characteristics for UV as well as offering an improved adhesion to the substrate.

In accordance with one aspect of the invention, the white standard paint comprising barium sulfate, binder and solvent in which polyvinyl alcohol is included in said binder and said polyvinyl alcohol has a polymerization degree ranging from 900 to 1100 and a saponification degree ranging from 86 mol % to 90 mol % is provided.

The white standard paint in accordance with the first aspect of the invention shows improved weather resistance and reflectivity characteristics for UV range.

In accordance with another aspect of the invention, a white standard paint in which a mixture ratio of said binder and said barium sulfate is ranging from 0.5 wt. % to 6 wt. %, is provided.

The white standard paint in accordance with the second aspect shows the improved adhesion to the substrate without reducing the diffuse reflection characteristics.

In accordance with a third aspect of the invention, a white standard paint in which said barium sulfate has a purity degree of 99.9% and above is provided.

In accordance with other aspect of the invention, a white standard paint in which the paint further comprising distilled water and said solvent is ethanol, said barium sulfate has a purity degree of 99.9% and above, as well as a mixture ratio of 43.3 wt. %, a mixture ratio of said polyvinyl alcohol is 2.7 wt. %, a mixture ratio of said ethanol is 27.0 wt. % and said mixture ratio of said distilled water is residual, is provided.

In accordance with still other aspect of the invention, a white standard paint in which the paint further comprising distilled water and said solvent is ethanol, said barium sulfate has a purity degree of 99.9% and above, as well as a mixture ratio of 44.7 wt. %, a mixture ratio of said polyvinyl alcohol is 1.3 wt. %, a mixture ratio of said ethanol is 27.0 wt. % and said mixture ratio of said distilled water is residual, is provided.

DESCRIPTION OF THE PREFERRED EMBODIMENTS

Embodiment 1

Figure 1:
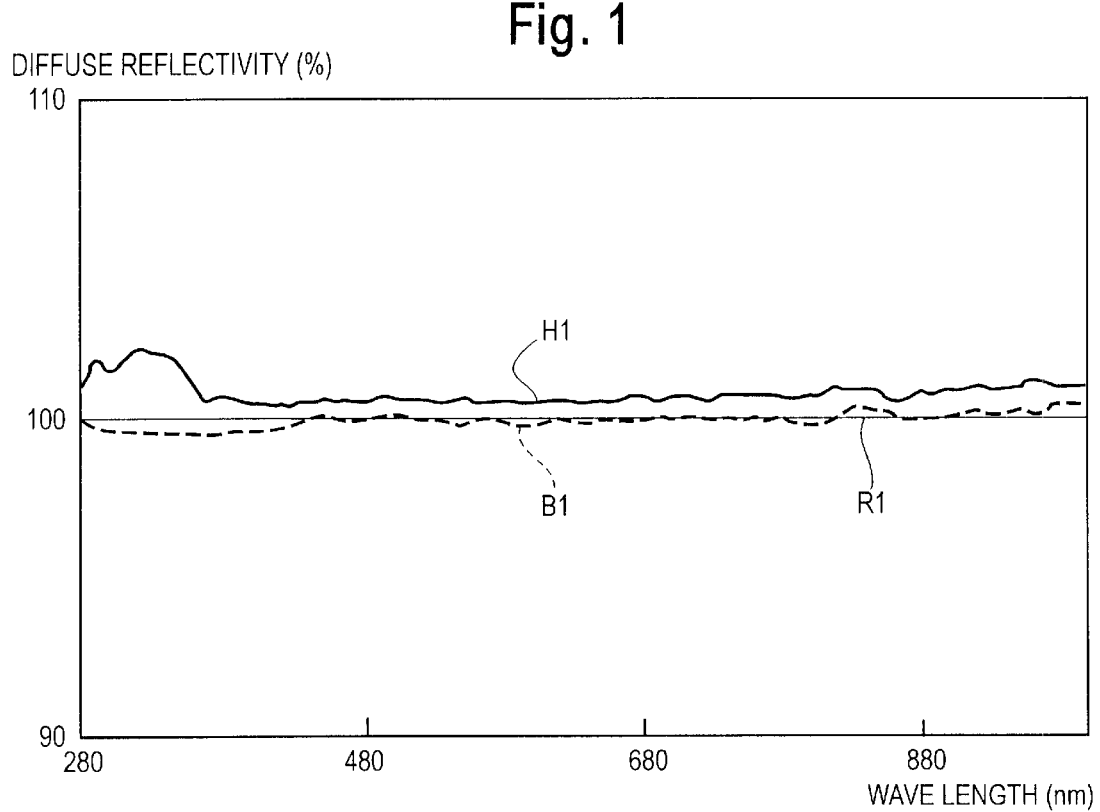
FIG. 1 is a comparative diagram of the diffuse reflectivity characteristics of white standard paint in accordance with the preferred embodiment 1 of the invention.

In embodiment 1 the white standard paint contains barium sulfate, binder, solvent and distilled water in which barium sulfate having a purity degree of 99.9% and above, so called that such a high degree of purity is used. Further, for material as the binder, polyvinyl alcohol is used and the polymerization degree of the polyvinyl alcohol is ranging from 900 to 1100 and its saponification degree ranges from 86 mol % to 90 mol %. As for the main solvent, distilled water is used and ethanol is solved in water.

The mixture ratio of the white standard paint in this embodiment is described below.

Barium sulfate . . . 43.3 wt. %

Polyvinyl alcohol . . . 2.7 wt. %

Ethanol (reagent first grade or more is desirable) . . . 27.0 wt. %

Distilled water (electric conductivity 10 micro/cm or under) residual

The reason why polyvinyl is used as binder is that the material of binder has an influence on the diffuse reflectivity characteristics. It is selected from the point of view that adhesion to substrates which is further described later, reflectivity characteristics for UV and weather resistance are taken into consideration by a method of trial and error experiment.

Further, the reason why polymerization degree of polyvinyl alcohol ranging from 900 to 1100 and the saponification degree ranging from 86 mol % to 90 mol % are selected is that the solubility to solvent (if the polymerization degree is higher than 1100, it becomes difficult to dissolve) and the durability for water of the coated film are taken into consideration (if the polymerization degree is lower then 900, it tends to dissolve easily in water).

When a solubility of binder to the solvent is satisfactory, the barium sulfate can be homogeneously dispersed. Based on tendency that the barium sulfate is homogeneously dispersed and also suitable selection of saponification degree, the diffuse reflectivity characteristics is improved, then it results in an improvement of reflectivity for UV.

In this embodiment, the mixture ratio of polyvinyl alcohol on barium sulfate in the embodiment is 2.7 wt. % on 43.3 wt. %, however, it may be suitable that the mixture ratio of binder to barium sulfate is ranging from 0.5 wt. % to 6 wt. %.

In case the mixture ratio is less than 0.5 wt. %, when the white standard paint is applied on the substrate and a reflection film is formed, adhesion to the substrate of the reflection Mm and the cohesive power of the coating film is getting lowered. In case the mixture ratio higher than 6 wt. %, when the reflection film is formed, the diffuse reflection characteristics is getting entirely lowered.

When the substrate material is composed of polycarbonate, the adhesion is satisfactory though the mixture ratio is 0.5 wt. %, In case the substrate material is composed of glass or metal, the mixture ratio of the order of 0.1 wt. % also gives a satisfactory adhesion, however, the mixture ratio of 0.5 wt. % and above is desirable from the view point of adhesion to any kind of substrate material.

The reason for using distilled water is to prevent contamination of foreign substances like dust and/or iron rust that reduces the reflection characteristics.

Further, as for the reasons why ethanol is used as secondary solvent, the membraneous coating formation, the solubility with water, labor safety and environmental conservation are taken into account.

FIG. 1 shows result of measurement for diffuse reflectivity characteristics when the saponification degree of polyvinyl alcohol is altered.

Sign R1 shows the reflectivity characteristics of white standard paint available from the market (Market product R1). The reflectivity characteristics for every wavelength of this white standard paint of market product R1 is depicted as 100 and the reflectivity characteristics of the white standard paint of the present invention is comparatively plotted to it.

Sign B1 shows the reflectivity characteristics of white standard paint (Reference B1) manufactured using polyvinyl alcohol as binder with saponification degree ranging from 80 mol % to 86 mol %. Sign H1 shows the reflectivity characteristics of white standard paint (Embodiment H1) manufactured using polyvinyl alcohol with saponification degree ranging from 86 mol % to 90 mol % as binder.

As shown obviously in FIG. 1, the diffuse reflectivity characteristics of the white standard paint of Reference B1 is hardly different from the Market product, however, the diffuse reflectivity characteristics of Embodiment H1 is totally improved compared to the diffuse reflectivity characteristics of the Market product.

Embodiment 2

In this embodiment 2, the mixture ratio of barium sulfate and polyvinyl alcohol is changed. The mixture ratio of the white standard paint is described below.

Figure 2:
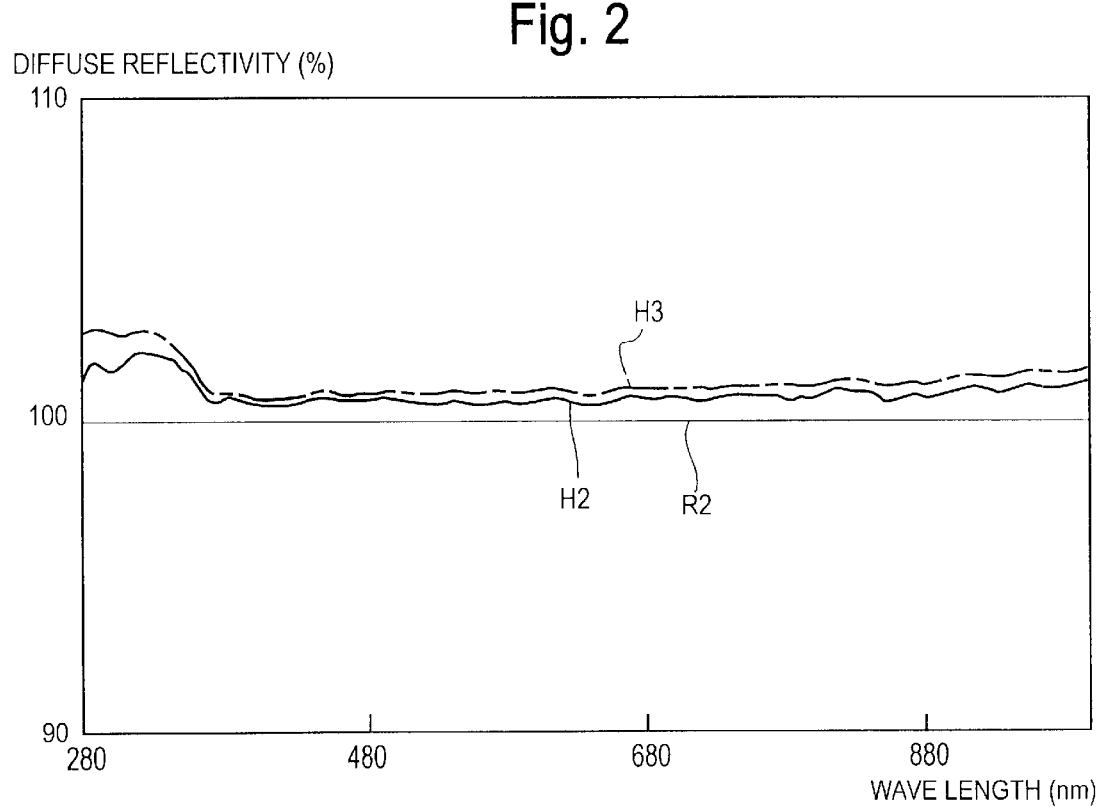
FIG. 2 is a comparative diagram of the diffuse reflectivity characteristics of white standard paint in accordance with the preferred embodiment 2 of the invention.

Barium sulfate . . . 44.7 wt. %
Polyvinyl alcohol . . . 1.3 wt. %
Ethanol . . . 27.0 wt. %
Distilled water residual FIG. 2 shows result of measurement for diffuse refection characteristics of the altered ratio of barium sulfate on polyvinyl alcohol with a saponification degree ranging from 86 mol % to 90 mol %.

Sign R2 indicates the diffuse reflectivity characteristics of Market product R1 shown in FIG. 1, and Sign H2 indicates the diffuse reflectivity characteristics of Embodiment H1 shown in FIG. 1. Sign H3 shows the diffuse reflectivity characteristics of white standard paint (Embodiment H3) manufactured with polyvinyl alcohol as binder with a saponification degree ranging from 86 mol % to 90 mol % and with a mixture ratio of polyvinyl alcohol on barium sulfate of on 1.3 wt. % to 44.7 wt. %.

As obviously shown in FIG. 2, the diffuse reflectivity characteristics is improved when the mixture ratio of polyvinyl alcohol on barium sulfate is decreased.

Though the diffuse reflection characteristics is improved when the mixture ratio of polyvinyl alcohol on barium sulfate is decreased, it reduces the adhesion to the substrate as previously stated. When considering both of the diffuse reflection characteristics and the adhesion to the substrate totally, a mixture ratio of polyvinyl alcohol on barium sulfate ranging from 3 wt. % to 6 wt. % is desirable.

The white standard paint provided by the present invention improves the reflectivity of the UV range as well as a favorable weather resistance and also adhesion to the substrate as described above.

What is claimed is:

1. A white standard paint comprising:

barium sulfate;

a binder; and a solvent, polyvinyl alcohol being used as ingredient of said binder, said polyvinyl alcohol having a polymerization degree ranging from 900 to 1100 and a saponification degree ranging from 86 mol % to 90 mol %, wherein said barium sulfate has a purity degree of 99.9% or more.

2. A white standard paint comprising:

barium sulfate; and a binder;

polyvinyl alcohol being used as ingredient of said binder, said polyvinyl alcohol having a polymerization degree ranging from 900 to 1100 and a saponification degree ranging from 86 mol % to 90 mol %, and a mixture ratio of said barium sulfate and binder being ranging from 0.5 wt. % to 6 wt. %.

3. A white standard paint comprising:

barium sulfate;

a binder;

a solvent; and distilled water, polyvinyl alcohol being used as ingredient of said binder, said solvent being ethanol, said barium sulfate having a purity degree of 99.9% or more, said polyvinyl alcohol having a polymerization degree ranging from 900 to 1100 and a saponification degree ranging from 86 mol % to 90 mol %, and a mixture of said barium sulfate, polyvinyl alcohol, ethanol, and distilled water having ratios in which the barium sulfate is 43.3 wt. %, the polyvinyl alcohol is 2.7 wt % the ethanol is 27.0 wt. % and the distilled water is residual.

4. A white standard paint comprising:

barium sulfate;

a binder;

a solvent; and distilled water, polyvinyl alcohol being used as ingredient of said binder, said solvent being ethanol, said polyvinyl alcohol having a polymerization degree ranging from 900 to 1100 and a saponification degree ranging from 86 mol % to 90 mol %, and said barium sulfate having a purity degree of 99.9% or more, and a mixture of said barium sulfate, polyvinyl alcohol, ethanol, and distilled water having mixture ratios in which the barium sulfate is 44.7 wt. %, the polyvinyl alcohol is 1.3 wt % the ethanol is 27.0 wt. % and the distilled water is residual.

* * * * *